United States Patent
Eckardt et al.

[11] Patent Number: 6,054,108
[45] Date of Patent: Apr. 25, 2000

[54] CATALYST SYSTEM AND RECOMBINATION DEVICE FOR RECOMBINING HYDROGEN AND OXYGEN, IN PARTICULAR FOR A NUCLEAR POWER STATION AND METHOD FOR OPERATING A CATALYST SYSTEM

[75] Inventors: Bernd Eckardt, Bruchköbel; Axel Hill, Stockstadt, both of Germany

[73] Assignee: Siemens Aktiengesellschaft, Munich, Germany

[21] Appl. No.: 09/265,154

[22] Filed: Mar. 9, 1999

Related U.S. Application Data

[63] Continuation of application No. PCT/DE97/01860, Aug. 27, 1997.

[30]     Foreign Application Priority Data

Sep. 9, 1996 [DE]   Germany .......................... 196 36 557

[51] Int. Cl.[7] .............................. B01J 23/00; B01J 23/40; B01J 23/72; B01J 23/44
[52] U.S. Cl. ........................................................ 423/580.1
[58] Field of Search ................................ 423/580.1, 219, 423/247, 246, 248; 502/325, 331, 339, 326, 527.12, 527.11

[56]           References Cited
U.S. PATENT DOCUMENTS 3,901,821  8/1975  Retallick ................................. 252/410
3,929,422  12/1975  Kreidl et al. ............................... 23/288
5,301,217  4/1994  HEck et al. ........................... 423/580.1

FOREIGN PATENT DOCUMENTS

| 0301536A2 | 2/1989 | European Pat. Off. . |
|---|---|---|
| 0622107A2 | 11/1994 | European Pat. Off. . |
| 0622107A3 | 11/1994 | European Pat. Off. . |
| 3604416C2 | 4/1990 | Germany . |
| 4015228A1 | 11/1991 | Germany . |
| 4428956C1 | 8/1996 | Germany . |

*Primary Examiner*—Steven P. Griffin
*Assistant Examiner*—Maribel Medina
*Attorney, Agent, or Firm*—Herbert L. Lerner; Laurence A. Greenberg; Werner H. Stemer

[57]                 ABSTRACT

A catalyst system and a recombination device for recombining hydrogen and oxygen, and a method for operating a catalyst system, are used in particular for a nuclear power station. The catalyst system includes a metallic carrier plate which is coated with a first and a second catalytic noble or precious metal. The carrier plate has a low mass and is constructed with high heat conductivity. It is coated in a first zone with the first catalytic noble or precious metal and in a second zone with the second noble or precious metal. The first and second zones are preferably located on the same side of the carrier plate. Platinum and palladium are preferably used as the noble or precious metals. The palladium serves for early ignition, and the platinum ensures good activation along with sufficient catalyst poison resistance.

29 Claims, 2 Drawing Sheets

CATALYST SYSTEM AND RECOMBINATION DEVICE FOR RECOMBINING HYDROGEN AND OXYGEN, IN PARTICULAR FOR A NUCLEAR POWER STATION AND METHOD FOR OPERATING A CATALYST SYSTEM

CROSS-REFERENCE TO RELATED APPLICATION

This application is a continuation of International Application No. PCT/DE97/01860, filed Aug. 27, 1997, which designated the United States, now WO 9811406.

BACKGROUND OF THE INVENTION

Field of the Invention

The invention relates to a catalyst system and a recombination device for the recombination of hydrogen and/or carbon monoxide with oxygen, including a metallic carrier plate which is coated with a first and a second catalytic noble or precious metal, in particular for a nuclear power station. The invention also relates to a method for operating such a catalyst system and such a recombination device.

In a nuclear power station, after an incident with a loss of coolant, large quantities of hydrogen and carbon monoxide may be released into a safety vessel (containment). Without any countermeasure, it is possible for the atmosphere of the safety vessel to be enriched with hydrogen to such an extent that a detonatable mixture may be formed. In the event of late accidental ignition, the intactness of the safety vessel could be put at risk, above all due to the combustion of a relatively large quantity of hydrogen.

In view of those safety considerations, it is expedient to develop an early-starting recombination device in order to eliminate the hydrogen and carbon monoxide from the atmosphere of the safety vessel through the use of recombination with oxygen. That device should not lose activity appreciably, even in the event of a relatively long service life in the atmosphere of the safety vessel, and it should be capable of starting completely passively at low ambient temperatures. That is because the device is also intended to be used in the case of incidents at low ambient temperatures which may occur, for example, in TMI incident situations or by operating ventilation with resulting ambient temperatures of only 30° C. or below.

The safety of a nuclear power station can be increased decisively through the use of such a recombination device, which must contain a number of specially constructed catalyst systems, since it is possible for the hydrogen to be reduced passively in good time.

European Patent EP 0 527 968 B1, corresponding to U.S. Pat. Nos. 5,473,646 and 5,301,217, discloses a recombination device, in which a number of catalyst systems in the form of plane plates, that are coated on both sides with catalyst material, such as platinum and/or palladium, are provided. That recombination device is particularly suitable for reducing hydrogen in the atmosphere of the safety vessel of a nuclear power station. In that case, each catalyst system includes a carrier plate, made of high-grade, stainless or special steel, which has on both sides a thin layer, the thickness of which is in the micrometer range and which is formed, in particular, of platinum and/or palladium. A multiplicity of such coated individual plates is disposed in a housing which may be constructed as a module. The gas stream to be monitored flows through the housing from below, and that gas stream leaves the housing in an upper region through an outlet orifice made laterally.

It must be stated that, in this case, each high-grade steel plate is provided completely with a monometallic coating on each side. That recombination device was provided, in particular, for use in serious incidents, in which temperatures of more than 50° C. in the atmosphere of the safety vessel must be expected.

Furthermore, the prior art has described various noble or precious metal mixtures for the purpose of recombination (German Patent DE 36 04 416 C2, European patent Application EP 0 301 536 A2).

In order to avoid deactivation, the recombination devices known in the prior art may be additionally equipped with filters or else mounted in closed vessels which are opened if so required.

Such additional devices, although avoiding or reducing catalyst aging, are cost-intensive and complicated and can be constructed only with difficulty in the light of other requirements, such as, for example, earthquakes.

SUMMARY OF THE INVENTION

It is accordingly an object of the invention to provide a catalyst system and a recombination device for recombining hydrogen and oxygen, in particular for a nuclear power station, and a method for operating a catalyst system, which overcome the hereinafore-mentioned disadvantages of the heretofore-known devices and methods of this general type and with which it is possible to bring various properties into effect, for example in succession, in a gas stream, in particular in a nuclear power station, with refinements relating, in particular, to start-up at low temperature and to poison and high-temperature resistance.

With the foregoing and other objects in view there is provided, in accordance with the invention, a catalyst system for the recombination of hydrogen and/or carbon monoxide with oxygen, in particular for a nuclear power station, comprising a metallic carrier plate having high heat conductivity, a first zone and a second zone; a first catalytic noble metal coating the first zone; and a second catalytic noble metal coating the second zone; the first and second zones preferably located on the same side of the carrier plate. It must be remembered that, in this case, the carrier plate should have low mass and consequently low heat capacity.

In this case, therefore, the properties of the first and of the second catalytic noble or precious metal are utilized, preferably in succession, in a combination device.

In accordance with another feature of the invention, the second noble or precious metal has a lower reaction temperature and/or higher catalytic activity than the first noble or precious metal. It should also be present in a high concentration. In that case, the second zone acts, as it were, as an initial zone for initiating the recombination.

In accordance with a further feature of the invention, the first noble or precious metal is more poison-resistant than the second noble or precious metal. In that case, the catalyst system is still effective whenever the second noble or precious metal has already become inactive as a result of the catalyst poison.

In accordance with an added feature of the invention, the first noble or precious metal is platinum and the second noble or precious metal is preferably palladium.

Platinum has been selected and qualified in this case, above all, due to its good temperature resistance and resistance to catalyst poisons. Furthermore, with platinum as the first catalytic noble or precious metal, not only hydrogen but also carbon monoxide (to carbon dioxide), can be recombined. Palladium, which is likewise suitable for hydrogen recombination, has lower stability towards catalyst poisons. Consequently, and because it is poisoned reversibly by carbon monoxide, it should not be used for the large-area coating of the carrier plate. However, the advantage of palladium over platinum is its property of starting up at lower ambient temperatures. It may therefore be said that a multi-metallic catalyst system with platinum and palladium starts up at substantially lower ambient temperatures and hydrogen concentrations, namely at less than 30° C. and at less than 2% by volume of hydrogen. The special configuration of platinum and palladium on a carrier plate of low mass in a catalyst system leads to a situation which exerts a positive mutual influence, so that special chemical and technological requirements for use in a nuclear power station can be satisfied exceedingly well by such a bifunctional system. These requirements amount to early start-up at low hydrogen concentrations, at the same time with high temperature and poison resistance.

In accordance with an additional feature of the invention, the carrier plate is provided with a further catalytic layer which includes, in particular, copper (Cu) or copper oxide (CuO). Carbon monoxide recombination can be additionally improved at low temperatures by applying this further catalytic layer.

In accordance with yet another feature of the invention, the carrier plate is formed of a non-corrosive high-grade, special or stainless steel, specifically with a plate thickness of less than or equal to 0.2 mm.

In accordance with yet a further feature of the invention, the first and/or the second catalytic noble or precious metal is preferably applied to the carrier plate through the use of an adhesion promoter layer and/or an intermediate layer. Relevant details emerge from European Patent EP 0 527 968 B1, corresponding to U.S. Pat. Nos. 5,473,646 and 5,301,217. The carrier plate should have low mass and consequently low heat capacity.

In accordance with yet an added feature of the invention, the first closed zone is much larger than the second closed zone. The properties of the first catalytic noble or precious metal during functioning can be particularly emphasized in this way.

In accordance with yet an additional feature of the invention, platinum and palladium are used and there is a provision for the applied mass of the first noble or precious metal to be more than 75% of the applied mass of the second noble or precious metal. The high-density palladium doping (the palladium mass is 25% of the total platinum mass, as mentioned) which is applied locally to the carrier plate makes it possible to combine the positive catalytic properties of platinum and palladium in such a way as to obtain a bifunctional catalyst system having substantially better properties than those of the two individual noble or precious metals.

In accordance with again another feature of the invention, in order to ensure simple handling, the carrier plate, having the applied layers being formed of the first and second noble or precious metal, is constructed as a plane plate.

In accordance with again a further feature of the invention, for recombination, the catalyst system is exposed to a gas stream which contains hydrogen and/or carbon monoxide as well as oxygen. The configuration is then such that the first noble or precious metal is applied to the carrier plate in a first zone facing the gas stream and the second noble or precious metal is applied thereto in a second zone facing away from the gas stream. With regard to the use of platinum and palladium, this may be expressed as follows: Advantageously, the sensitive palladium noble or precious metal is concentrated in the part facing the direction of flow, while the poison-resistant platinum noble or precious metal, predominantly not as a noble or precious metal mixture, is concentrated, on the same thin metallic carrier plate, on the part located downstream in the direction of flow. The high microscopic density of the active palladium centers makes it possible to set in motion a self-assisting catalytic reaction in this zone. This is improved further if a carrier plate of low mass (heat capacity) is used. This reaction may be assisted through the use of metallic conduction, for example by a retaining device with high heat conductivity, so that the heat occurring during initial recombination is transported into the pure platinum zone and makes it possible for the reaction to start in this case. By virtue of this combination, "aging effects", caused by use in the atmosphere of the nuclear power station, such as, for example, by the sorption of hydrocarbons and welding vapors, aerosol pollution, etc., can be compensated for over long operating periods of many years (for example 5 or even 10 years), without the loss, otherwise occurring after a short stand-by time, of the self-starter function which is important for safety. Safety is therefore increased decisively and, at the same time, the costs are kept low, since a cyclic exchange of the catalyst systems is avoided.

In accordance with again an added feature of the invention, the second zone may be, in particular, a strip which amounts to about 5 to 20%, in particular less than 10%, of the area of the first zone.

In accordance with again an additional feature of the invention, in order to achieve an optimum utilization of the carrier plate, the front side and the rear side of the carrier plate are coated in the same way.

In accordance with still another feature of the invention, there is provided a Teflon coating on the second zone. The early-start capability, in particular under moist ambient conditions, may be achieved through the use of such a limited Teflon coating for producing temporary hydrophobic properties in the palladium-doped strip. However, coating with Teflon is wasted at high temperatures of more than 200 to 300° C. and, indeed, in the case of high radiation, activity-diminishing waste products are formed. Advantageously, therefore, only limited coating of the palladium-doped strip is carried out, so that altogether, the coating is only less than 10%. This quantitative limitation makes it possible to avoid relevant poisoning and, due to the properties of further heat transmission which have been described, a simultaneous further improvement in the early-starter function may be achieved.

With the objects of the invention in view, there is also provided a recombination device for the recombination of at least one of hydrogen and carbon monoxide with oxygen, comprising at least one of the catalyst systems.

In accordance with another feature of the invention, there is provided a housing, for example a push-in rack, for receiving one or more catalyst systems of the above-described type.

In accordance with a further feature of the invention, a plurality of identical catalyst systems are held, in particular parallel to one another, in a retaining device with high heat conductivity.

In accordance with an added feature of the invention, the holding preferably takes place in the second zone, in which the second catalytic noble or precious metal is located.

In a recombination device, the configuration of the individual catalyst systems, preferably having a planar construction, is carried out form-lockingly and force-lockingly, specifically parallel to one another in a metallic carrier or the retaining device just mentioned. A form-locking connection is one which connects two elements together due to the shape of the elements themselves, as opposed to a force-locking connection, which locks the elements together by force external to the elements. The spacing between the individual catalyst systems should be less than 2 cm, preferably about 1 cm. It is desirable to maintain the spacing between the catalyst plates at the values just mentioned since, due to the laminar flow states between the catalyst plates, only insufficient heat transmission is possible by convection. The heat is transmitted primarily by radiation. Due to the force-locking connection of more than 0.1 kp between the thin catalyst plates, on one hand, and the carrier or retaining device, on the other hand, a direct further transmission of heat into the adjacent plate occurs after a catalyst system has started. In order to keep cooling influences caused by the surroundings low, insulation is advantageously provided between the catalyst carrier and an outer wall, for example in the form of an insulating air gap of more than 5 mm through which the flow does not pass. The outer temperatures at the recombinator device are also decisively reduced thereby. As a result, in the case of relatively high hydrogen concentrations of, for example, 8 to 10% by volume, ignition can be avoided. This is because the outer temperature Ta can be kept below the ignition temperature Tz of 520° C. on the outside, in spite of a high reaction temperature Tr of, for example, 700° C.

As compared with the other catalyst systems that were already known, the present recombination device dispenses with protective and/or activating devices.

The recombination device, described herein, for the recombination of hydrogen and carbon monoxide with oxygen is therefore distinguished in that two catalytic noble or precious metals, preferably platinum and palladium, are simultaneously accommodated, specifically in a manner concentrated in different zones, on a common metallic carrier plate having high heat conductivity. Taking into account the low heat capacity (mass) of the plates and the favorable heat conduction properties of the carrier unit or retaining device, the functions a) start-up at low temperature, b) poison resistance and c) high-temperature resistance, are fulfilled without any further additional devices.

With the objects of the invention in view, there is additionally provided a method for operating a catalyst system or a recombination device for the recombination of at least one of hydrogen and carbon monoxide with oxygen, which comprises providing a metallic carrier plate having high heat conductivity, a first zone with a first catalytic noble metal coating, and a second zone with second catalytic noble metal coating; and bringing a gas stream possibly containing hydrogen and/or carbon monoxide as well as oxygen into contact initially with the second catalytic noble metal in the second zone and thereafter with the first catalytic noble metal in the first zone.

Other features which are considered as characteristic for the invention are set forth in the appended claims.

Although the invention is illustrated and described herein as embodied in a catalyst system and a recombination device for recombining hydrogen and oxygen, in particular for a nuclear power station, and a method for operating a catalyst system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
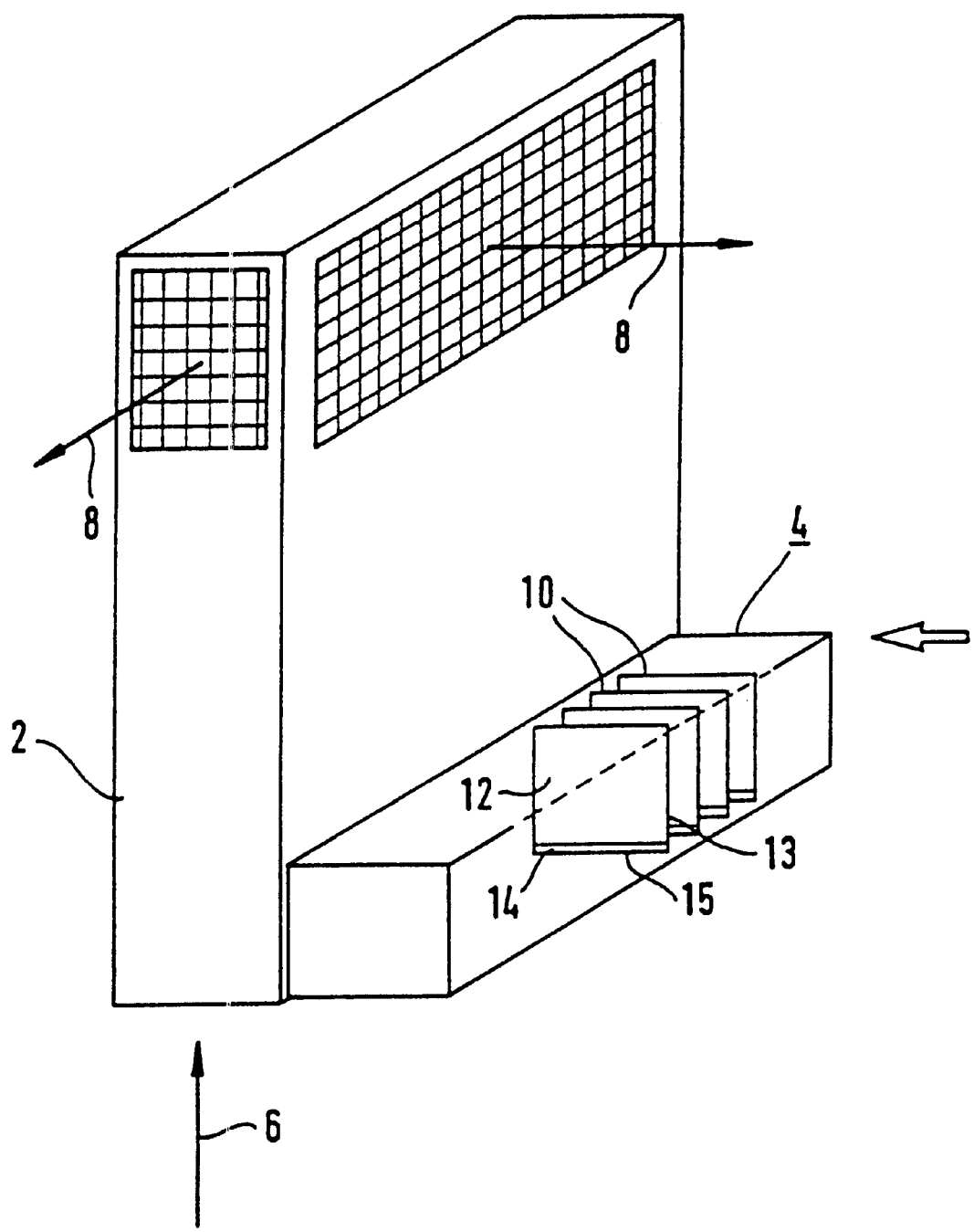
FIG. 1 is a diagrammatic, perspective view of a recombination device for hydrogen which starts at relatively low temperatures.

Referring now to the figures of the drawings in detail and first, particularly, to FIG. 1 thereof, there is seen a recombination device which is known in terms of geometrical construction from European Patent EP 0 527 968 B1, corresponding to U.S. Pat. Nos. 5,473,646 and 5,301,217.

Accordingly, there is provided a rectangular box 2, having a lower part into which a draw-out push-in catalyst rack 4 can be pushed. FIG. 1 shows a drawn-out position. A gas stream to be recombined can enter the box 2 through an inflow orifice provided in a bottom region, as is indicated by an arrow 6. The gas stream leaves the box 2 in an upper region through lateral outflow orifices, as is illustrated by arrows 8.

The push-in rack 4 contains a multiplicity of catalyst elements or catalyst systems 10 insertable from above. Elements 2 and 4 provide a housing for receiving at least one catalyst system 10. These systems are disposed parallel to one another, specifically at a spacing of less than or equal to 2 cm, for example 10 mm. Both a front side and a rear side of each catalyst system 10 are divided into two zones. In this case, an upper first zone 12 is coated with a first catalytic noble or precious metal 13 and a lower narrower second zone 14 is coated with a second catalytic noble or precious metal 15. Both zones 12, 14 are formed by catalyst coating on a non-illustrated thin carrier plate made of a material with high heat conductivity, such as high-grade, special, or stainless steel. The first zone 12 includes approximately 90% of the entire area, and the second zone 14, which is constructed in the lower region as a horizontal strip, includes about 10% of the entire area.

As is known, the first zone 12 is covered with the poison-resistant platinum having a comparatively high reaction temperature, as the first noble or precious metal 13. The second zone 14 is covered with the not especially poison-resistant palladium having a comparatively low reaction temperature, as the second noble or precious metal 15. The covering or coating may, in particular, be such as that described in European Patent EP 0 527 968 B1, corresponding to U.S. Pat. Nos. 5,473,646 and 5,301,217. The configuration of the catalyst systems 10, which is in the form of a card-file box, is characterized by form-locking and force-locking fixing.

Figure 2:
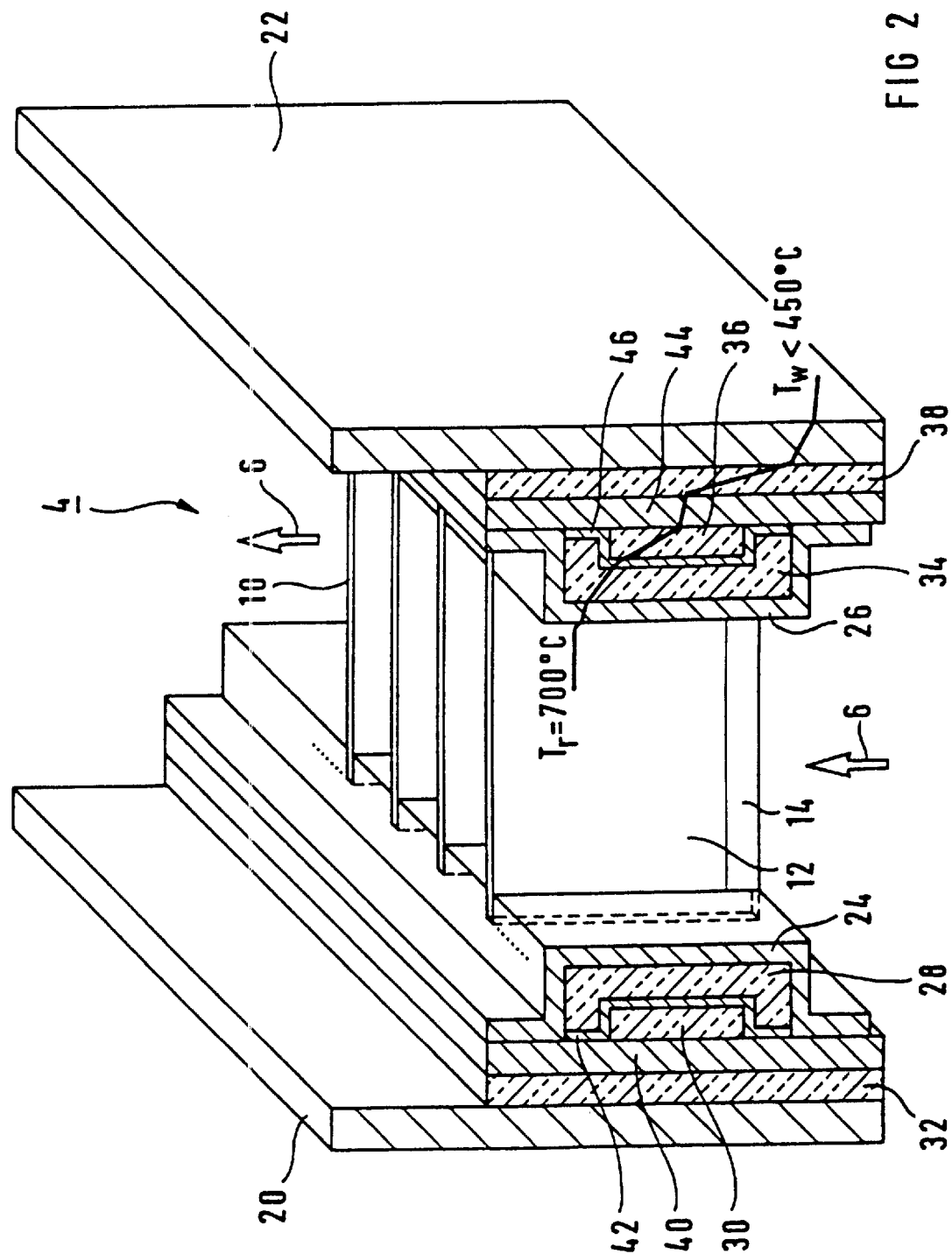
FIG. 2 is a partly sectional, perspective view of a parallel configuration of a plurality of catalyst systems within such a recombination device.

According to FIG. 2, the push-in rack 4 has two side walls 20 and 22, between which the plate-shaped catalyst systems 10 are disposed. These walls 20, 22 may be formed of metal.

Form-locking and force-locking fastening is carried out through the use of fastening plates 24, 26 which form a retaining device. These fastening plates 24, 26 may, as illustrated, have a U-shaped profile. Insulation is provided between the plates 24, 26 and the walls 20, 22. In the present case, insulating walls 28, 30, 32 and 34, 36, 38 that are formed of insulating material and held by holding plates 40, 42 and 44, 46, are provided. Instead of the walls of insulating material, a non-illustrated insulating air gap may also be used. The outer temperatures of the recombination device are decisively reduced through the use of such insulation. This is because the outer temperature Tw of the wall can be kept below an ignition temperature Tz=500° C. on the outside, in spite of a high reaction temperature Tr of 700° C., for example. This is likewise illustrated graphically in FIG. 2.

The catalyst carrier which is used is a 0.05 mm thick carrier plate made of high-temperature-resistant non-corrosive steel, that is to say a plate having low mass and consequently low heat capacity. The doping of a continuous partial area with palladium is carried out after the platinum doping has been executed. In order to enlarge the surface of the catalyst plate, an intermediate layer ($Al_2O_3$ wash coat) is applied before the application of the platinum. Coating with a wash coat increases the geometrical surface by a factor of approximately 5000 (BET surface). The platinum crystals (<50 Angstroms) are fixed on this high specific surface of the wash coat in a finely distributed manner over various production steps, preferably heat treatment steps. The high-density application of the palladium doping then takes place in a locally limited manner, so that the self-starting reaction may be appropriately assisted by the microscopic proximity of the palladium crystals or else by the overlap of platinum crystals. The catalyst systems 10 preferably have a thickness of less than 0.2 mm.

The palladium catalyst is concentrated in a strip-shaped manner (see reference symbol 14) along an onflow edge or in a strip-shaped manner in a lower third of the carrier plate and is applied counter to the direction of flow. The area of the locally limited coating amounts, in general, to less than 10%. The reaction of the entire individual plate is started from the palladium centers which ignite the catalytic reaction at low temperatures. In this case, heat transport takes place particularly advantageously directly through the fastening plates 24, 26 forming a common metallic carrier and through a grain layer onto an adjacent platinum catalyst grain region. Activity-diminishing substances are desorbed from the platinum catalyst as a result of the heating of the platinum crystals, so that the catalytic ignition point of the platinum catalyst is appreciably earlier.

The desorption of activity-diminishing substances is propagated in a chain-like manner over the entire catalyst register. After the start of the entire catalyst register, the palladium catalyst, which has lower temperature stability than platinum, may lose activity, (for example, due to CO sorption), without platinum activity being influenced thereby. Even complete deactivation of the palladium catalyst is tolerable. It then acts as a sacrificial catalyst.

As already described above, the early-start capability, particularly under moist ambient conditions, may be improved by the limited coating of the platinum-doped strip with Teflon.

We claim:

1. A catalyst system for the recombination of at least one member selected from the group consisting of hydrogen and carbon monoxide with oxygen, comprising:

a metallic carrier plate having a first zone and a second zone;

a first catalytic noble metal coating said first zone; and a second catalytic noble metal coating said second zone, said second catalytic noble metal being different from said first catalytic noble metal and having a lower reaction temperature than said first catalytic noble metal, said second zone providing conduction heat to said first zone through said metallic carrier plate when said second zone is exposed to at least one member selected from the group consisting of hydrogen and carbon monoxide.

2. The catalyst system according to claim 1, wherein said first and second zones are located on the same side of said carrier plate.

3. The catalyst system according to claim 1, wherein said first catalytic noble metal is more poison-resistant than said second catalytic noble metal.

4. The catalyst system according to claim 1, wherein said first catalytic noble metal is platinum.

5. The catalyst system according to claim 4, wherein said second catalytic noble metal is palladium.

6. The catalyst system according to claim 5, wherein an applied mass of said first catalytic noble metal is more than 75% of an applied mass of said second catalytic noble metal.

7. The catalyst system according to claim 1, including a further catalytic layer on said carrier plate, said further catalytic layer including a material selected from the group consisting of copper and copper oxide.

8. The catalyst system according to claim 1, wherein said carrier plate is formed of a non-corrosive high-grade steel.

9. The catalyst system according to claim 1, wherein at least one of said catalytic noble metals is applied to said carrier plate by at least one of an adhesion promoter layer and an intermediate layer.

10. The catalyst system according to claim 1, wherein said first zone is much larger than said second zone.

11. The catalyst system according to claim 1, wherein an applied mass of said first catalytic noble metal is more than 75% of an applied mass of said second catalytic noble metal.

12. The catalyst system according to claim 1, wherein said carrier plate is a plane plate.

13. The catalyst system according to claim 1, wherein said carrier plate is exposed to a gas stream containing at least one member selected from the group consisting of hydrogen and carbon monoxide as well as oxygen, said first zone faces towards the gas stream, and said second zone faces away from the gas stream.

14. The catalyst system according to claim 1, wherein said second zone is a strip amounting to about 5 to 20% of the area of said first zone.

15. The catalyst system according to claim 1, wherein said second zone is a strip amounting to less than 10% of the area of said first zone.

16. The catalyst system according to claim 1, wherein said carrier plate has a front side and a rear side coated in the same way.

17. The catalyst system according to claim 1, including a Teflon coating on said second zone.

18. A recombination device for the recombination of at least one member selected from the group consisting of hydrogen and carbon monoxide with oxygen, comprising:

at least one catalyst system including a metallic carrier plate having a first zone, a second zone, a first catalytic noble metal coating said first zone, and a second catalytic noble metal coating said second zone, said second catalytic noble metal being different from said first catalytic noble metal and having a lower reaction temperature than said first catalytic noble metal, said second zone providing conduction heat to said first zone through said metallic carrier plate when said second zone is exposed to at least one member selected from the group consisting of hydrogen and carbon monoxide.

19. The recombination device according to claim 18, including a housing for receiving said at least one catalyst system.

20. The recombination device according to claim 18, including an outer wall, and insulation connecting said at least one catalyst system to said outer wall.

21. The recombination device according to claim 18, wherein said at least one catalyst system is a plurality of identical catalyst systems, and a retaining device with high heat conductivity holds said catalyst systems.

22. The recombination device according to claim 21, wherein said retaining device holds said catalyst systems parallel to one another.

23. The recombination device according to claim 21, wherein said catalyst systems are held in said retaining device in the vicinity of said second zones.

24. The recombination device according to claim 21, including an outer wall to which said retaining device is connected.

25. The recombination device according to claim 18, wherein said at least one catalyst system is a plurality of identical catalyst systems, and a push-in rack accommodates said catalyst systems.

26. The recombination device according to claim 25, wherein said catalyst systems each have a plate-shaped structure, a total thickness of at most 0.2 mm and a mutual spacing of less than 20 mm.

27. The recombination device according to claim 26, wherein said mutual spacing of said catalyst systems is about 10 mm.

28. A method for operating a catalyst system for the recombination of at least one member selected from the group consisting of hydrogen and carbon monoxide with oxygen, which comprises:

provoding a metallic carrier plate having a first zone with a first catalytic noble metal coating, and a second zone with a second catalytic noble metal coating, the second catalytic noble metal being different from the first catalytic noble metal and having a lower reaction temperature than the first catalytic noble metal; and bringing a gas stream possibly containing at least one member selected from the group consisting of hydrogen and carbon monoxide as well as oxygen into contact initially with the second catalytic noble metal in the second zone and thereafter with the first catalytic noble metal in the first zone, the second zone providing conduction heat to the first zone through the metallic carrier plate.

29. A method for operating a recombination device for the recombination of at least one member selected from the group consisting of hydrogen and carbon monoxide with oxygen, which comprises:

providing a metallic carrier plate having a first zone with a first catalytic noble metal coating, and a second zone with a second catalytic noble metal coating, the second catalytic noble metal being different from the first catalytic noble metal and having a lower reaction temperature than the first catalytic noble metal; and bringing a gas stream possibly containing at least one member selected from hydrogen and carbon monoxide as well as oxygen into contact initially with the second catalytic noble metal in the second zone and thereafter with the first catalytic noble metal in the first zone, the second zone providing conduction heat to the first zone through the metallic carrier plate.

* * * * *